United States Patent
Olbrich et al.

(10) Patent No.: US 10,798,296 B2
(45) Date of Patent: Oct. 6, 2020

(54) CAMERA SYSTEM FOR DETECTING CODINGS

(71) Applicant: ifm electronic GmbH, Tettnang (DE)

(72) Inventors: Ville Olbrich, Ravensburg (DE); Klaus Kohlmann, Ravensburg (DE); Christian Prestele, Tettnang (DE); Ralph Wilks, Wangen (DE); Andreas Gebhard, Tettnang (DE)

(73) Assignee: IFM ELECTRONIC GMBH, Tettnang (DE)

( * ) Notice: Subject to any disclaimer, the term of this patent is extended or adjusted under 35 U.S.C. 154(b) by 0 days.

(21) Appl. No.: 16/536,336

(22) Filed: Aug. 9, 2019

(65) Prior Publication Data

US 2020/0059594 A1     Feb. 20, 2020

(30) Foreign Application Priority Data

Aug. 14, 2018   (DE) .......................... 10 2018 119 691

(51) Int. Cl.
*H04N 5/232* (2006.01)
*H04N 5/14* (2006.01)
*G06K 9/32* (2006.01)

(52) U.S. Cl.
CPC .......... *H04N 5/23218* (2018.08); *G06K 9/32* (2013.01); *H04N 5/142* (2013.01); *H04N 5/23216* (2013.01); *H04N 5/232125* (2018.08)

(58) Field of Classification Search
CPC ......... H04N 5/23218; H04N 5/232125; H04N 5/142; H04N 5/23216; G06K 9/32
See application file for complete search history.

(56) References Cited

U.S. PATENT DOCUMENTS

| | | | | |
|---|---|---|---|---|
| 5,513,264 A * | 4/1996 | Wang | ................... | G06K 7/1095 209/546 |
| 9,652,653 B2 * | 5/2017 | Todeschini | ......... | G06K 7/10821 |
| 9,836,635 B2 * | 12/2017 | Negro | .................. | G06K 7/1417 |
| 2007/0069028 A1 * | 3/2007 | Nemet | ...................... | G06K 7/14 235/462.41 |
| 2011/0212717 A1 * | 9/2011 | Rhoads | ................... | G06F 16/58 455/420 |
| 2012/0194733 A1 | 8/2012 | Sauerwein, Jr. | | |
| 2013/0050517 A1 * | 2/2013 | Fan | ........................ | H04N 5/232 348/208.99 |
| 2013/0112750 A1 * | 5/2013 | Negro | .................. | G06K 7/1417 235/454 |
| 2016/0019406 A1 | 1/2016 | Hejl et al. | | |

(Continued)

FOREIGN PATENT DOCUMENTS

DE    102015214032 A1    1/2017
EP       1022608 A1    7/2000

OTHER PUBLICATIONS

Demant, C., et al., "Industrial Image Processing", Springer Verlag, Dec. 2011, pp. 104-108.

*Primary Examiner* — Antoinette T Spinks
(74) *Attorney, Agent, or Firm* — Leydig, Voit & Mayer, Ltd.

(57) ABSTRACT

A method for operating a camera system for detecting codings, in which positions of contour points of the codings are determined in relation to edges of a search zone of the camera system, wherein a reading reliability of the search zone is determined from a distance of the contour points from the edges of the search zone.

9 Claims, 5 Drawing Sheets

(56) References Cited

U.S. PATENT DOCUMENTS

| | | | |
|---|---|---|---|
| 2017/0300728 A1* | 10/2017 | Feng | G06K 7/10811 |
| 2018/0114323 A1* | 4/2018 | Hatstat | G06K 7/1452 |
| 2020/0184292 A1* | 6/2020 | O'Hagan | G06K 15/024 |

* cited by examiner

CAMERA SYSTEM FOR DETECTING CODINGS

CROSS-REFERENCE TO PRIOR APPLICATION

Priority is claimed to German Patent Application No. DE 10 2018 119 691.1, filed on Aug. 14, 2018, the entire disclosure of which is hereby incorporated by reference herein.

FIELD

The invention relates to a camera, and in particular to a camera system, for detecting codings, contours, and/or surfaces.

BACKGROUND

EP 1022608 A1 already discloses a device for detecting an image plane, in which device the camera projects a visible light pattern onto a subject in order to mark the detection range of the camera for a user. The light sources are arranged such that the light beams of the light source substantially follow the field of view of the camera.

A possible focusing device is known, for example, from DE 10 2015 214 032 A1, in which the focus of an optical system can be changed via a motor-gear assembly.

SUMMARY

In an embodiment, the present invention provides . . . .

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

In an embodiment, the present invention provides an improved camera system for detecting codings with a view to a high reading reliability.

These improvements are achieved with the camera system according to an embodiment of the invention, as well as by a method for operating such a camera system.

Advantageously provided is a method for operating a camera system for detecting codings, in which positions of contour points of the codings are determined in relation to edges of a search zone of the camera system, wherein a reading reliability of the search zone is determined from a distance of the contour points from the edges of the search zone.

This approach has the advantage that this information can be made available to a user for optimizing his search zone. Optionally, such settings can also be performed automatically on the basis of the data determined for reading reliability.

It is particularly useful if the reading reliability of the search zone is classified as critical if a number of the contour point positions which fall within a boundary region of the search zone exceeds a frequency limit value.

A further embodiment provides for determining a drift of the contour point positions over a plurality of detected contour point positions.

Likewise advantageously provided according to an embodiment is a camera system which is designed to carry out one of the aforementioned methods.

The invention is explained in more detail below based upon exemplary embodiments with reference to the drawings.

In the following description of the preferred embodiments, the same reference signs denote the same or comparable components.

Figure 1:
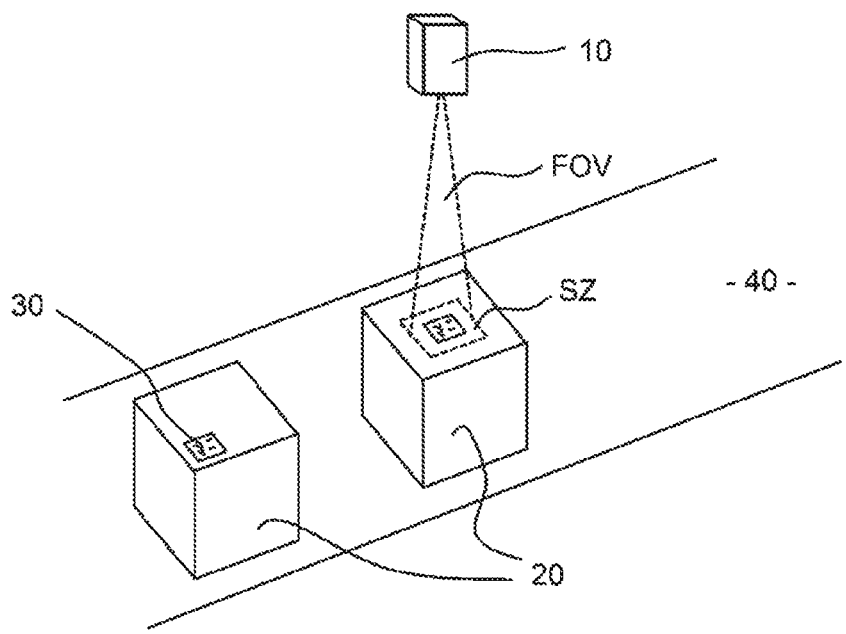
FIG. 1 a typical detection situation of a coding,
FIG. 2 an incorrect setting of a search zone,
FIG. 3 a well-adjusted search zone,
FIG. 4 a search zone incorrectly adjusted in the depth of field,
FIG. 5 a search zone well-adjusted as to both area and depth,
FIG. 6 a possible weighting of the reading reliability of positions in the search zone,
FIG. 7 a search zone histogram with critical reading reliability,
FIG. 8 a search zone histogram with a drift of the contour positions,
FIG. 9 a contour in a search zone.

FIG. 1 shows a stationary camera system 10 for detecting a coding in a typical detection situation. For example, several subjects 20 move past the detecting camera system 10 on a conveyor belt 40. The position and field of view FOV of the camera or camera system 10 are adjusted in such a way that a coding 30 can be reliably detected in a predetermined search zone SZ. However, in the left subject 20, the coding 30 is not located in a central region of the subject 20, and it is to be expected that the coding 30 is not to be detected within the predetermined search zone SZ.

Figure 2:
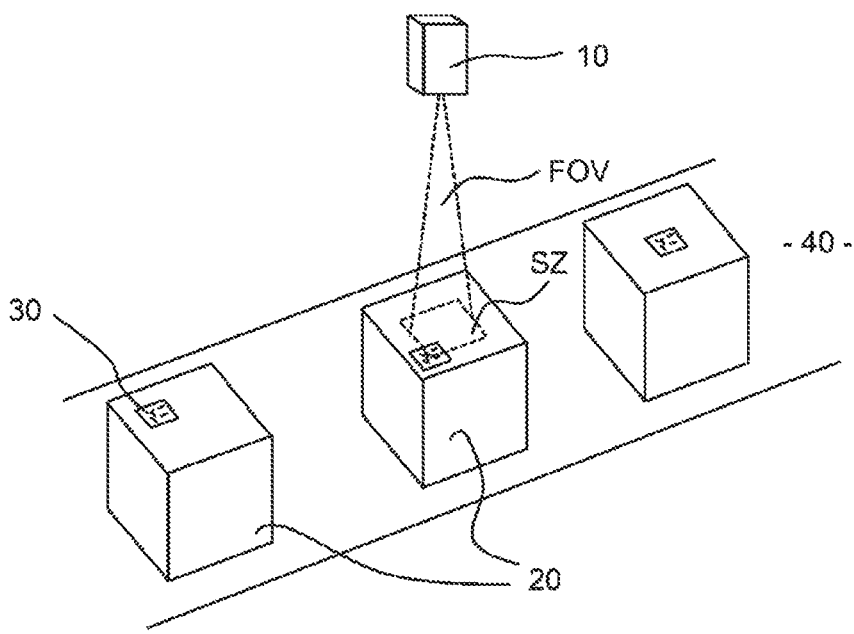

As can then be seen in FIG. 2, at a later point in time, the coding 30 is partially outside the search zone SZ and is expected to be recognized only with poor quality or not at all.

Figure 3:
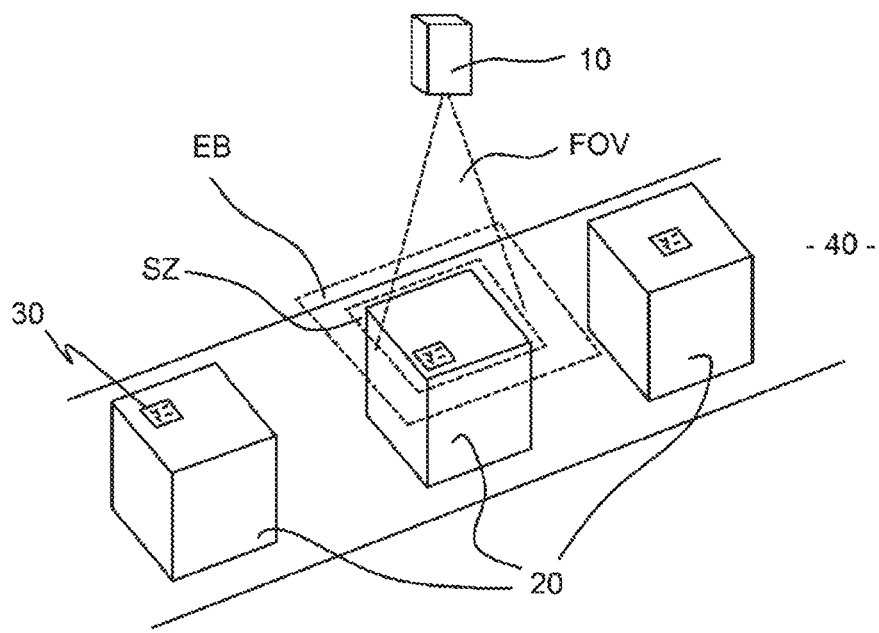

Enlarging the search zone SZ, e.g., by enlarging the field of view FOV, as shown in FIG. 3 is therefore advantageous. This enlargement of the search zone SZ can take place without any problems as long as the necessary search zone SZ does not exceed a maximum possible detection range EB predetermined by the camera 10. If a search zone SZ which exceeds the size of the maximum possible detection range EB is necessary, the search zone SZ can be enlarged, for example, by increasing the distance of the camera 10 and/or by shortening the focal length of the camera lens or exchanging it with a lens of a shorter focal length.

Figure 4:
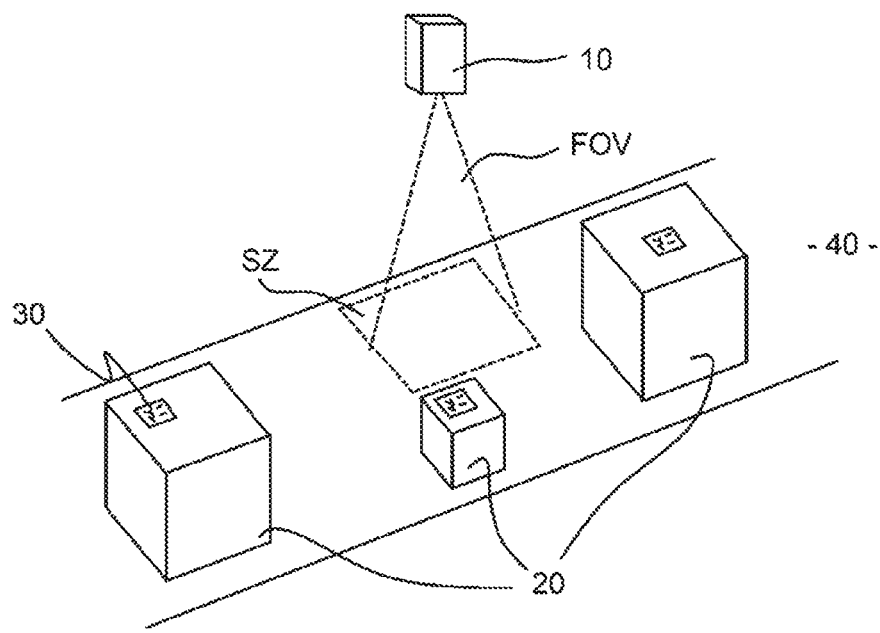

FIG. 4 shows another source of error, in which the subjects 20 have different heights, such that some subjects are outside of the depth of field range and are not reliably recognized.

Figure 5:
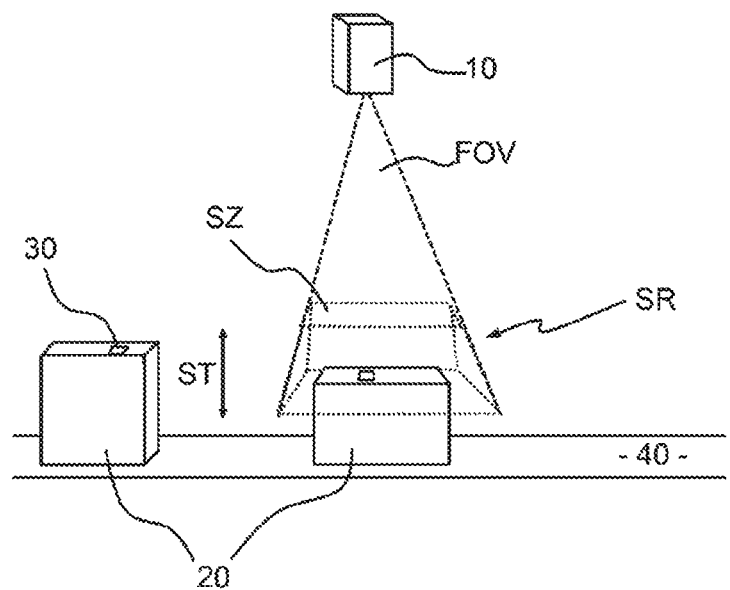

As shown in FIG. 5, it is advantageous to select the position of the camera, the aperture of the camera, and/or the focus of the lens such that all expected subject heights or distances of the codings 30 fall within the search zone SZ and within the predetermined depth of field range ST. The search zone SZ is thus extended three-dimensionally around the depth of field range ST. Strictly speaking, it is therefore a search space SR. Below, the term, search zone SZ, is also used synonymously for a search space SR.

The invention now provides for checking or determining the reading reliability of the search zone SZ during ongoing operation of the camera system 10 or in a calibration phase.

For this purpose, the positions of relevant contour points, such as the contour of the coding, a bounding box in OCR recognition, or points determined by other contour-matching methods, are detected and evaluated for each image with a successful reading or decoding. From the determined contour points, a position of the coding 30 in relation to the search zone SZ or the positions of the relevant contour points in relation to the edges of the search zone SZ can be determined. In a simple case, a relevant contour point can also be the center of gravity/center of the coding. In such a case, the limit values would have to be adapted accordingly.

In order to evaluate the search zone SZ, several subjects 20 with codings 30 are brought into the search zone SZ of the camera system 10, and images from which the position of the codings 30 or of the relevant contour points are determined are recorded. A statistic that allows statements about the frequency of the number of times the contour points come close to an edge of the search zone SZ is now generated over several images. A reading reliability of the search zone SZ can be determined from this statistic.

Figure 6:
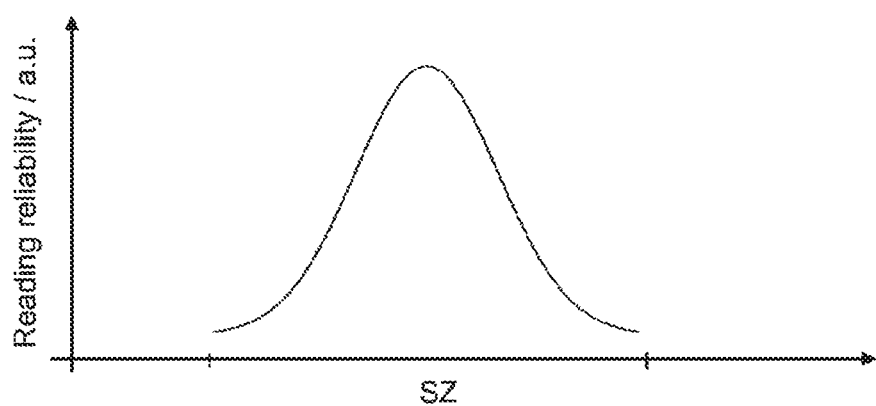

FIG. 6 shows a possible weighting of the position with a view to reading reliability. The reading reliability has its highest value in the central region of the search zone SZ, while it decreases strongly in the edge regions.

Instead of or in addition to a weighting of the positions, a distance of the coding or relevant contour points from the edge can also be detected and evaluated. Preferably, a shortest distance between the edge of the search zone SZ and the contour points of the coding 30 is determined for this purpose.

Figure 7:
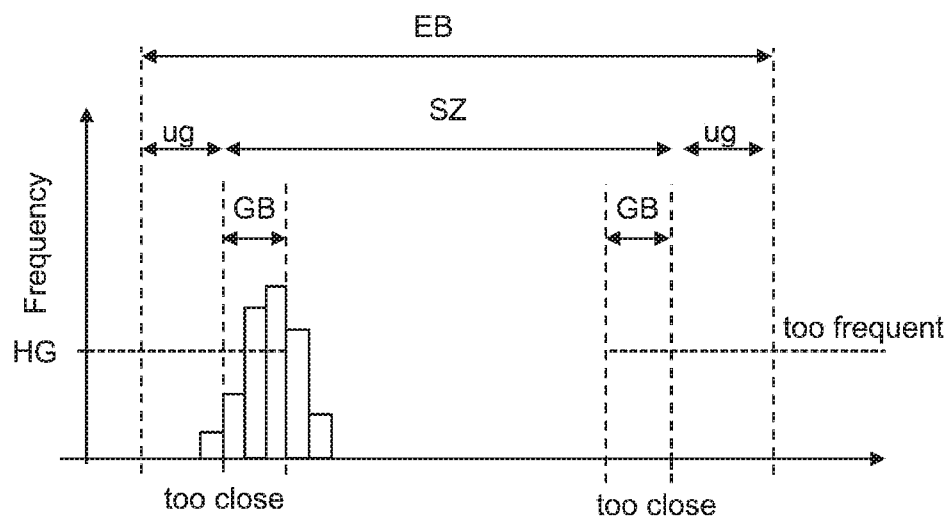

FIG. 7 shows a histogram of such a view. The frequency with which certain positions or distances occur is plotted. If possible and necessary, the histogram may optionally be expanded to the entire detection range EB of the camera. In order to evaluate the reading reliability of the search zone SZ, a boundary region GB or a distance limit value AG at the edges is defined as 'too close,' wherein a maximum number of events to be tolerated can additionally be defined as the frequency limit value HG, denoted here by 'too frequent.' If the number of positions that are 'too close' exceeds the defined frequency limit value HG, the reading reliability is considered critical, as illustrated by way of example in FIG. 7. In the case of a particularly sensitive application, the frequency limit value HG can optionally be adjusted to zero, so that the reading reliability is already classified as critical in the case of a single contour position that is 'too close.' It should be noted that the frequency limit value HG may be defined both as an absolute and as a percentage value.

If the limit values, 'too close' and/or 'too frequent,' are exceeded, an alarm can be provided, for example. For example, a user can be notified by the alarm that an improvement in reading reliability could be achieved.

Such a notification could, for example, serve to indicate:
a) that, although no erroneous readings have occurred, the positions of the codings or contour points in the search zone SZ are so unfavorable that, with a small change in position, erroneous readings are to be expected with high probability.
b) that erroneous readings have already occurred.

A histogram of the frequency distribution of the relevant contour positions corresponding to FIG. 7 can, for example, be displayed to the user, in order to rectify the situations according to a) or b). The histogram of FIG. 7 then readily shows in which direction the search zone must be moved for higher reading reliability. The histogram is preferably shown two-dimensionally in order to take into account x- and y-axes. If a three-dimensional search zone SR or a search space SR is to be viewed, the histogram can of course also be shown three-dimensionally, or a separate histogram be displayed for each axis.

As an alternative to the histogram, it is also possible to display the occurred positions of the contour points as an image. In the simplest case, each contour point found could be drawn as a simple point.

Particularly preferred is a representation as a so-called "heat map" in which, similar to a 2-D histogram, the affected cells are incremented and then displayed in color. A contour point is considered to be a Gaussian curve and affects several pixels of the image, depending upon how far they are from its center. Hot spots can thereby be recognized more easily.

Furthermore, specific settings of the camera system could be proposed, e.g., a change in the focal length of the lens or a change of the lens in order to change the field of vision or the aperture angle. In the case of a critical depth of field range ST, notifications regarding the focus to be adjusted, the camera distance to the subjects 20, or codings 30 could be provided. A recommendation regarding an adjustable aperture could also be given.

Particularly in the case of codings which already touch an edge of the search zone, an enlargement of the search zone SZ may no longer be possible. In such a case, a notification regarding the optimization of the sensor alignment could also be made, or, as already mentioned, a change to a larger aperture angle could be indicated. As stated, this can be made dependent upon how well the search zone or the complete detection range EB or the camera image is utilized.

This degree of utilization can be determined, for example, via features such as 'previously unused detection area.' This area is indicated as 'ug' by way of example in FIG. 7. This information can also be provided to the user independently of the previous warning notifications.

Optimization of the sensor alignment can consist in a lateral displacement or tilting, or even in a rotation, if, for example, the detection range EB or image region is not utilized sufficiently well due to the rotational position of the subject.

Figure 8:
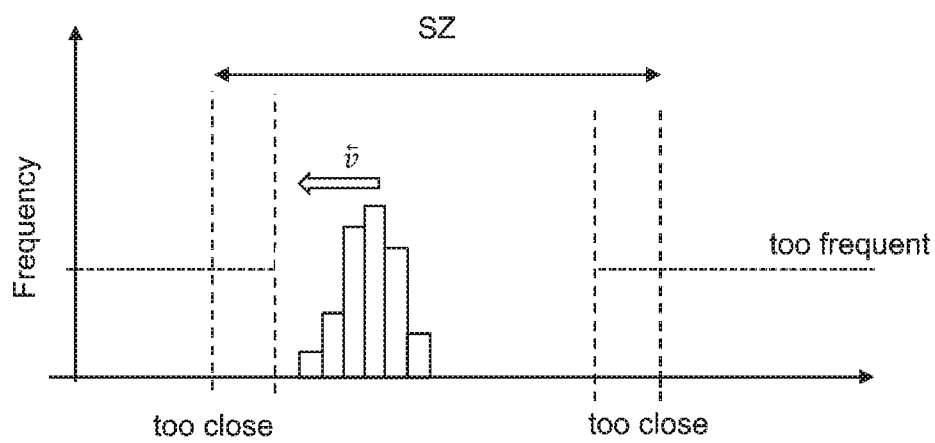

Further features, such as the center of gravity or orientation of the subject, can also be used to evaluate the direction of movement. A trend analysis that detects the drifts in these values over a sufficient number of images is conceivable. This effect is shown schematically in FIG. 8 by way of example. From a trend analysis, it can be seen that the frequency distribution moves to an edge of the search zone SZ with a drift velocity v.

The user can then be warned preventatively if, for example, an approximately linear drift of the position is detected. Rotation of the frequency distribution could also be detected in a two-dimensional view. A systematic change in the rotational position could indicate, for example, a misalignment of the sensor so that a corresponding warning can likewise be output.

Figure 9:
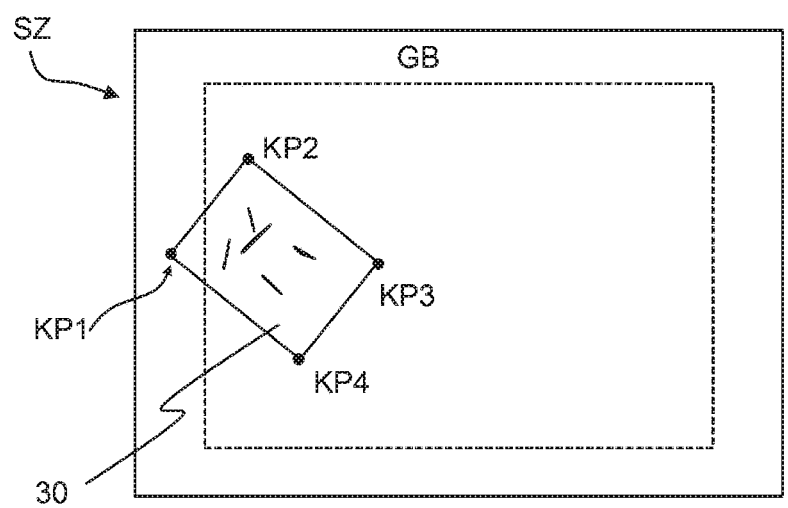

FIG. 9 shows an example of a coding 30 in a search zone SZ. The relevant contour points KP of the coding 30 are in this case the corner points of the rectangular outline of the coding 30. In the illustrated case, a contour point KP1 is within the boundary region GB of the search zone SZ. The coding 30 is thus evaluated as 'too close.' Whether the setting of the safety zone is considered to be critical in reading reliability then depends upon what frequency of such 'too close' events is acceptable.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

10 Reading device
20 Subject
30 Code
40 Conveyor belt
FOV Field of view
SZ Search zone
SR Search space
EB Detection range
ST Depths of field
GB Boundary region
KP Contour point

What is claimed is:

1. A method for operating a stationary camera system for detecting codings applied to subjects, the method comprising:
    moving the subjects past the camera system;
    determining positions of contour points of the codings in relation to edges of a search zone of the camera system; and
    determining a reading reliability of the search zone from a distance of the contour points from the edges of the search zone by detecting the codings of several of the subjects brought into the search zone.

2. The method according to claim 1, wherein the reading reliability of the search zone is classified as critical in a case in which a number of the contour point positions falling within a boundary region of the search zone exceeds a frequency limit value.

3. The method according to claim 1, further comprising determining a drift of the contour point positions over a plurality of detected contour point positions.

4. The method according to claim 1, further comprising adjusting the search zone based on the determined reading reliability.

5. The method according to claim 4, wherein the search zone is adjusted by enlarging a field of view of the camera system.

6. The method according to claim 4, wherein the search zone is adjusted by increasing a distance of a camera of the camera system to the subjects, and/or by shortening a focal length of a camera lens of the camera system or exchanging the camera lens with a different lens having a shorter focal length.

7. The method according to claim 1, wherein a position of a camera of the camera system, an aperture of the camera and/or a focus of a camera lens of the camera are selected or adjusted based on the reading reliability such that expected heights of the subjects and/or expected distances of the contour points of the codings fall within the search zone and within a predetermined depth of field range.

8. The method according to claim 1, further comprising adjusting an alignment of a camera of the camera system based on the determined positions of the contour points of the codings.

9. A camera system configured to carry out the method of claim 1.

* * * * *